United States Patent
Kwon et al.

(10) Patent No.: US 9,130,491 B2
(45) Date of Patent: Sep. 8, 2015

(54) METHOD OF CONTROLLING AIR BLOWER OF FUEL CELL VEHICLE

(71) Applicant: Hyundai Motor Company, Seoul (KR)

(72) Inventors: Soonwoo Kwon, Gyeonggi-do (KR); Joon Yong Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 8 days.

(21) Appl. No.: 14/096,539

(22) Filed: Dec. 4, 2013

(65) Prior Publication Data

US 2014/0167658 A1  Jun. 19, 2014

(30) Foreign Application Priority Data

Dec. 13, 2012 (KR) .................. 10-2012-0145738

(51) Int. Cl.
*H02P 3/14* (2006.01)

(52) U.S. Cl.
CPC ....................................... *H02P 3/14* (2013.01)

(58) Field of Classification Search
CPC .............. Y02T 10/7005; Y02T 10/705; Y02T 10/72116; Y02T 90/34; H02P 3/14
See application file for complete search history.

(56) References Cited

U.S. PATENT DOCUMENTS

2009/0257190 A1* 10/2009 Yoda ............................. 361/690
2012/0304622 A1* 12/2012 Verbrugge et al. .............. 60/274

* cited by examiner

*Primary Examiner* — Karen Masih
(74) *Attorney, Agent, or Firm* — Mintz Levin Cohn Ferris Glovsky and Popeo, P.C.; Peter F. Corless

(57) ABSTRACT

A system and a method of controlling a blower of a vehicle. The method includes detecting, by a controller, a turning of a key to an off position of the vehicle. In addition, the controller is configured to detect whether a high voltage DC-DC converter and a high voltage battery are normally operated in response to detecting the turning of the key to an off position. Regenerative energy generated by a regenerative brake operation of the blower is transmitted by the controller through two different paths based on whether the high voltage DC-DC converter and the high voltage battery are normally operated.

9 Claims, 3 Drawing Sheets

METHOD OF CONTROLLING AIR BLOWER OF FUEL CELL VEHICLE

CROSS-REFERENCE TO RELATED APPLICATION

This application claims priority to and the benefit of Korean Patent Application No. 10-2012-0145738 filed in the Korean Intellectual Property Office on Dec. 13, 2012, the entire contents of which are incorporated herein by reference.

BACKGROUND (a) Field of the Invention

The present invention relates to a system and method of controlling a blower of a fuel cell vehicle, and more particularly, to a system and method of controlling a blower of a fuel cell vehicle capable of shortening a time for stopping an operation of a blower at the time of turning a key to an off position of a fuel cell vehicle.

(b) Description of the Related Art

In general, a fuel cell refers to a type of electric power generator which does not convert chemical energy of fuel into heat by combustion, but converts the chemical energy into electrical energy in a fuel cell stack by an electrochemical reaction. The fuel cell is widely used for supplying electric power to drive electrical and electronic products as well as industrial and household appliances and vehicles.

A polymer electrolyte membrane fuel cell among the fuel cells, which is used as an energy source for driving a vehicle, includes a membrane electrode assembly (MEA) including an electrolyte membrane, through which hydrogen ions pass, and catalyst electrode layers, in which an electrochemical reaction occurs, attached to both sides of the electrolyte membrane, a gas diffusion layer that uniformly distributes reactant gases and transmits generated electrical energy, a gasket and a fastening device that maintain airtightness of the reactant gases and a coolant and a proper fastening pressure, and a separation plate that moves the reactant gases and the coolant.

In the polymer electrolyte membrane fuel cell, hydrogen which is fuel and oxygen (e.g., air) which is an oxidant are supplied to an anode and a cathode of the membrane electrode assembly through a flow path of the separation plate, respectively, and the oxygen (e.g., air) is supplied to the cathode while the hydrogen is supplied to the anode.

The hydrogen supplied to the anode is decomposed into hydrogen ions and electrons by a catalyst of the electrode layer disposed on both sides of the electrolyte membrane, and only the hydrogen ions are selectively transmitted to the cathode through the electrolyte membrane, which is a positive ion exchange membrane, and simultaneously, the electrons are transmitted to the cathode through the gas diffusion layer and the separation plate, which are conductors.

At the cathode, the hydrogen ions supplied through the electrolyte membrane and the electrons transmitted through the separation plate come into contact with the oxygen from air supplied to the cathode by an air supplying apparatus and cause a reaction that produces water. Additionally, the flow of electrons through an external conducting wire, which is generated by movement of the hydrogen ions, generates a current.

The air supplying apparatus includes an air cleaner that filters foreign substances found in air, an air blower that compresses and supplies the air filtered by the air cleaner, and a controller (e.g., blower pump control unit, BPCU) that operates the air blower.

In the fuel cell vehicle having the aforementioned air supplying apparatus, it is necessary to prevent the membrane electrode assembly (MEA) from drying by shutting off the air supply into the fuel cell stack by rapidly reducing a rotation speed of the air blower, which is operated at a substantially high speed when the vehicle is turned off via a regenerative brake operation.

However, while a high voltage battery may be charged with regenerative energy generated by the regenerative brake operation of the air blower when all high voltage components of the fuel cell vehicle are normal, it may not be possible to stop the air blower rapidly using the regenerative brake operation when the high voltage battery or a high voltage DC-DC converter (HDC) fails.

The above information disclosed in this section is only for enhancement of understanding of the background of the invention and therefore it may contain information that does not form the prior art that is already known in this country to a person of ordinary skill in the art.

SUMMARY

The present invention provides a method of controlling a blower (e.g., an air blower) of a fuel cell vehicle that has advantages of stopping the blower in a substantially short time by eliminating a voltage generated by a regenerative brake operation of the blower by using stator resistance of a motor when turning the key to an off position of the fuel cell vehicle.

An exemplary embodiment of the present invention provides a method of controlling a blower of a fuel cell vehicle and may include: detecting a turning of a key to an off position of the fuel cell vehicle; detecting whether a high voltage DC-DC converter and a high voltage battery are normally (e.g., without error) operated when the turn of a key to an off position is detected; and consuming regenerative energy generated by a regenerative brake operation of the blower through two different paths based on whether the high voltage DC-DC converter and the high voltage battery are detected to be normally operating.

The consuming of the regenerative energy may include transmitting the regenerative energy to the high voltage battery through a voltage control of the high voltage DC-DC converter to charge the high voltage battery when the high voltage DC-DC converter and the high voltage battery are normally operated. In addition, the consuming of the regenerative energy may include consuming the regenerative energy using stator resistance of a motor/inverter when the high voltage DC-DC converter and the high voltage battery are not normally operated (e.g., error occurs).

According to the method of controlling a blower of a fuel cell vehicle according to an exemplary embodiment of the present invention, the blower, which may be configured to supply air to a fuel cell stack, may be stopped in a substantially short time by a regenerative brake operation when the fuel cell vehicle turns the key to an off position, thereby efficiently preventing the fuel cell stack from drying.

When the high voltage DC-DC converter (HDC) or the high voltage battery fails, to prevent the high voltage battery to not be charged with the regenerative energy generated by the regenerative brake operation of the blower, the regenerative energy may be transmitted to the motor by the motor control unit (MCU) to thus eliminate the regenerative energy using stator resistance of the motor, thereby stopping an operation of the blower in a substantially short time even when the high voltage DC-DC converter or the high voltage battery fails.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an exemplary embodiment of the present invention will be described in detail with reference to the accompanying drawings.

Figure 1:
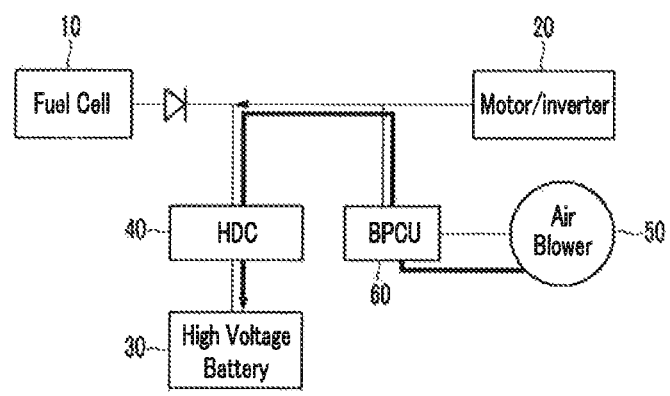
FIG. 1 is an exemplary view of a power system of a fuel cell vehicle, which brakes a blower by a regenerative brake operation when a high voltage DC-DC converter (HDC) and a high voltage battery are normal (e.g., no failure has occurred) according to an exemplary embodiment of the present invention.

Referring to FIG. 1, a configuration of a power system of a fuel cell vehicle, which performs a method of controlling a blower (e.g., an air blower) according to an exemplary embodiment of the present invention, is illustrated. Specifically, a motor/inverter 20 may include a motor driven by being supplied with electrical energy and an inverter that controls the motor may be connected to a fuel cell 10 which produces electrical energy through an electrochemical reaction of fuel. In addition, a high voltage battery 30, which may be charged with the electrical energy, may be connected to the fuel cell 10 via a high voltage DC-DC converter (HDC) 40.

The high voltage DC-DC converter (HDC) 40 may be connected in parallel between the fuel cell 10 and the driving three generating apparatus 20 to allow a voltage supplied to the motor of the motor/inverter 20 to be safely maintained. In addition, the HDC may be configured to match balance of output voltages of the fuel cell 10 and the high voltage battery 30, which are different from each other, and allow a surplus voltage and regenerative brake energy of the fuel cell 10 to be provided at the high voltage battery 30 as a charging voltage.

The motor/inverter 20 may further include a motor control unit (MCU) configured to operate a drive of the motor. In addition, an air blower 50, that compresses and supplies air to the fuel cell 10 while operated by being supplied with electrical energy from the fuel cell 10 or the high voltage battery 30, may be connected to the high voltage battery 30 via a controller 60 of the air blower 50. The controller 60 may include a blower pump control unit (BPCU) configured to operate a pump that compresses and pumps air into the air blower.

Accordingly, it may be necessary to stop an operation of the air blower 50 substantially rapidly when the fuel cell vehicle is turned off after driving to prevent a fuel cell stack from drying. As a method of stopping the air blower 50 in a substantially short time, the air blower 50 may be stopped via a regenerative brake operation.

When the air blower 50 is stopped via the regenerative brake operation and the high voltage DC-DC converter 40 and the high voltage battery 30 are normally operated without failing, regenerative energy generated when the air blower 50 is stopped by the regenerative brake operation may be transmitted to the high voltage battery 30 via the high voltage DC-DC converter 40 to charge the high voltage battery 30, as depicted by the arrow of FIG.

However, when the high voltage DC-DC converter 40 or the high voltage battery 30 fails when the air blower 50 is stopped by the regenerative brake operation, the high voltage battery 30 may not be charged with regenerative energy generated when the air blower 50 is stopped via the regenerative brake operation.

Figure 2:
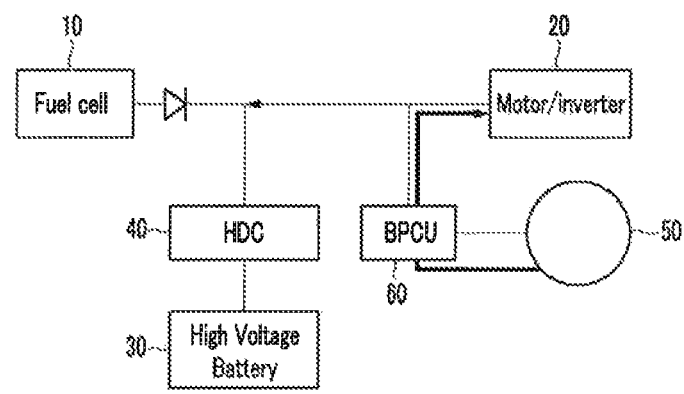
FIG. 2 is an exemplary view of a power system of a fuel cell vehicle, which transmits regenerative energy to eliminate the regenerative energy when a high voltage DC-DC converter (HDC) and a high voltage battery fail according to an exemplary embodiment of the present invention.

As described above, when the high voltage DC-DC converter 40 or the high voltage battery 30 fails, the regenerative energy may be transmitted to the motor/inverter 20 by the blower pump control unit 60, as depicted by the arrow of FIG. 2, and the motor/inverter 20 consumes and removes the regenerative energy using stator resistance of the motor, thereby rapidly stopping an operation of the air blower 50 using the regenerative brake operation.

The motor of the motor/inverter 20 may be an induction motor wherein, torque may be generated only when a slip frequency is added to a rotation frequency of a rotor, and torque may not be generated when the slip frequency is zero.

Thus, regenerative electrical energy may be consumed by applying the regenerative electrical energy generated by the regenerative brake operation of the air blower 50.

Figure 3:
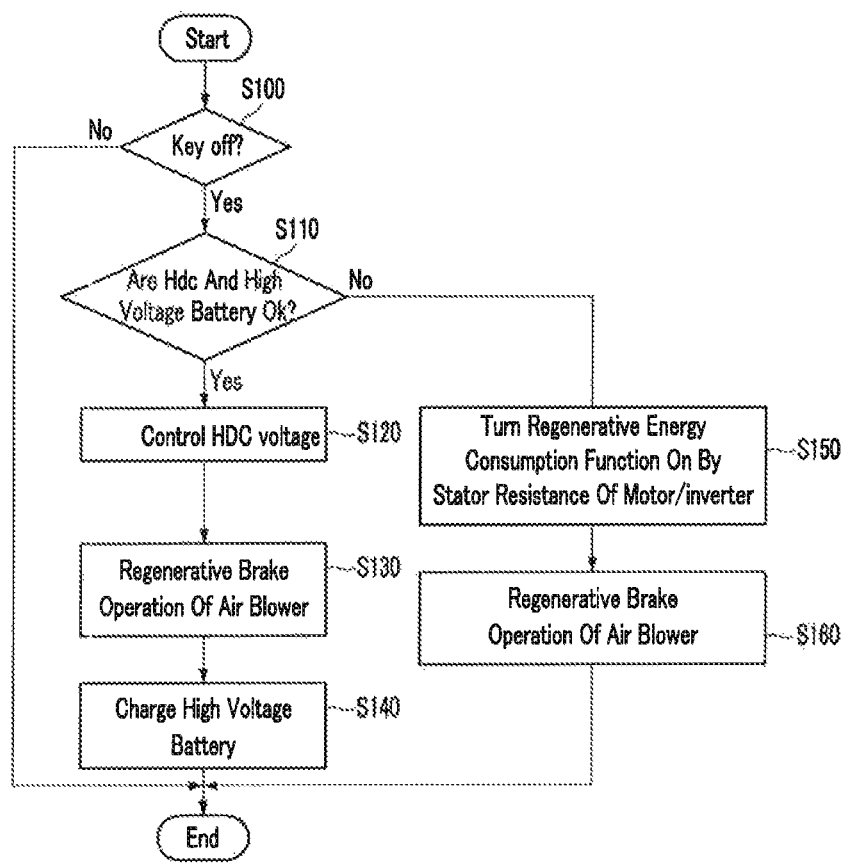
FIG. 3 is an exemplary flow chart of a method of controlling a blower of a fuel cell vehicle according to an exemplary embodiment of the present invention.

Referring to FIG. 3, an exemplary flow chart of a method of controlling the air blower according to an exemplary embodiment of the present invention is illustrated. In a start step, the turning of a key to an off position of the fuel cell vehicle may be detected (S100). In step S100, when the key off operation is detected, whether the high voltage DC-DC converter (UDC) and the high voltage battery 30 are normally operated may be detected (S110).

The regenerative energy generated by the regenerative brake operation of the air blower may be consumed through two different paths based on whether the high voltage DC-DC converter (HDC) and the high voltage battery 30 are normally operated. In other words, when the high voltage DC-DC converter (HDC) and the high voltage battery 30 are normally operated, electrical energy generated by the regenerative brake operation (S130) of the air blower 50 may be transmitted to the high voltage battery 30 through a voltage control (S120) of the high voltage DC-DC converter (HDC) to charge the high voltage battery 30 (S140).

When the high voltage DC-DC converter (HDC) and the high voltage battery 30 are not normally operated, a function of consuming regenerative energy by using the stator resistance of the motor/inverter 20 may be prepared (S150), the air blower 50 may be stopped via the regenerative brake operation (S160), and then the regenerative electrical energy generated when the air blower 50 is stopped may be eliminated by the stator resistance.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the accompanying claims.

DESCRIPTION OF SYMBOLS

| | |
|---|---|
| 10: Fuel cell | 20: Motor/inverter |
| 30: High voltage battery | 40: High voltage DC-DC converter |
| 50: Air blower | 60: Blower pump control unit |

What is claimed is:

1. A method of controlling a blower of a vehicle, comprising:
   detecting, by a controller, a turning of a key to an off position of the vehicle;
   in response to detecting the off position, detecting, by the controller, whether a high voltage DC-DC converter and a high voltage battery are operating normally; and
   transmitting, by the controller, regenerative energy generated by a regenerative brake operation of the blower through two paths based on whether the high voltage DC-DC converter and the high voltage battery are normally operated.

2. The method of claim 1, wherein:
   in response to detecting a normal operation of the high voltage DC-DC converter and the high voltage battery, transmitting, by the controller, the regenerative energy to the high voltage battery via a voltage control of the high voltage DC-DC converter to charge the high voltage battery.

3. The method of claim 1, wherein:
   in response to detecting an abnormal operation of the high voltage DC-DC converter and the high voltage battery, transmitting, by the controller, the regenerative energy using stator resistance of a motor and an inverter.

4. A blower control system, the system comprising:
   a controller configured to:
      detect a turning of a key to an off position of the vehicle;
      detect whether a high voltage DC-DC converter and a high voltage battery are operating normally in response to detecting the off position; and
      transmit regenerative energy generated by a regenerative brake operation of the blower through two paths based on whether the high voltage DC-DC converter and the high voltage battery are normally operated.

5. The system of claim 4, wherein the controller is further configured to:
   transmit the regenerative energy to the high voltage battery via a voltage control of the high voltage DC-DC converter to charge the high voltage battery in response to detecting a normal operation of the high voltage DC-DC converter and the high voltage battery.

6. The system of claim 4, wherein the controller is further configured to:
   transmit the regenerative energy using stator resistance of a motor and an inverter in response to detecting an abnormal operation of the high voltage DC-DC converter and the high voltage battery.

7. A non-transitory computer readable medium containing program instructions executed by a controller, the computer readable medium comprising:
   program instructions that detect a turning of a key to an off position of the vehicle;
   program instructions that detect whether a high voltage DC-DC converter and a high voltage battery are operating normally in response to detecting the off position; and
   program instructions that transmit regenerative energy generated by a regenerative brake operation of the blower through two paths based on whether the high voltage DC-DC converter and the high voltage battery are normally operated.

8. The non-transitory computer readable medium of claim 7, further comprising:
   program instructions that transmit the regenerative energy to the high voltage battery via a voltage control of the high voltage DC-DC converter to charge the high voltage battery in response to detecting a normal operation of the high voltage DC-DC converter and the high voltage battery.

9. The non-transitory computer readable medium of claim 7, further comprising:
   program instructions that transmit the regenerative energy using stator resistance of a motor and an inverter in response to detecting an abnormal operation of the high voltage DC-DC converter and the high voltage battery.

* * * * *